June 30, 1970    R. B. SMITH    3,517,914
VIBRATING FURNACE FOR PELLET MATERIAL
Filed Feb. 6, 1968    2 Sheets-Sheet 2
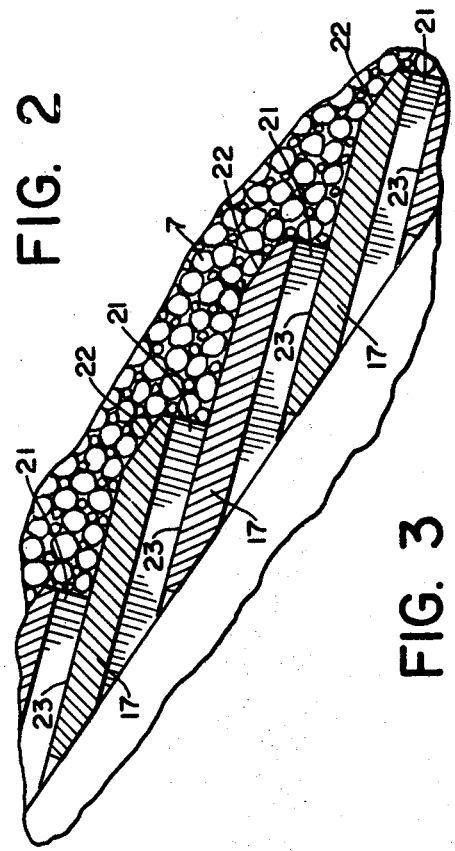
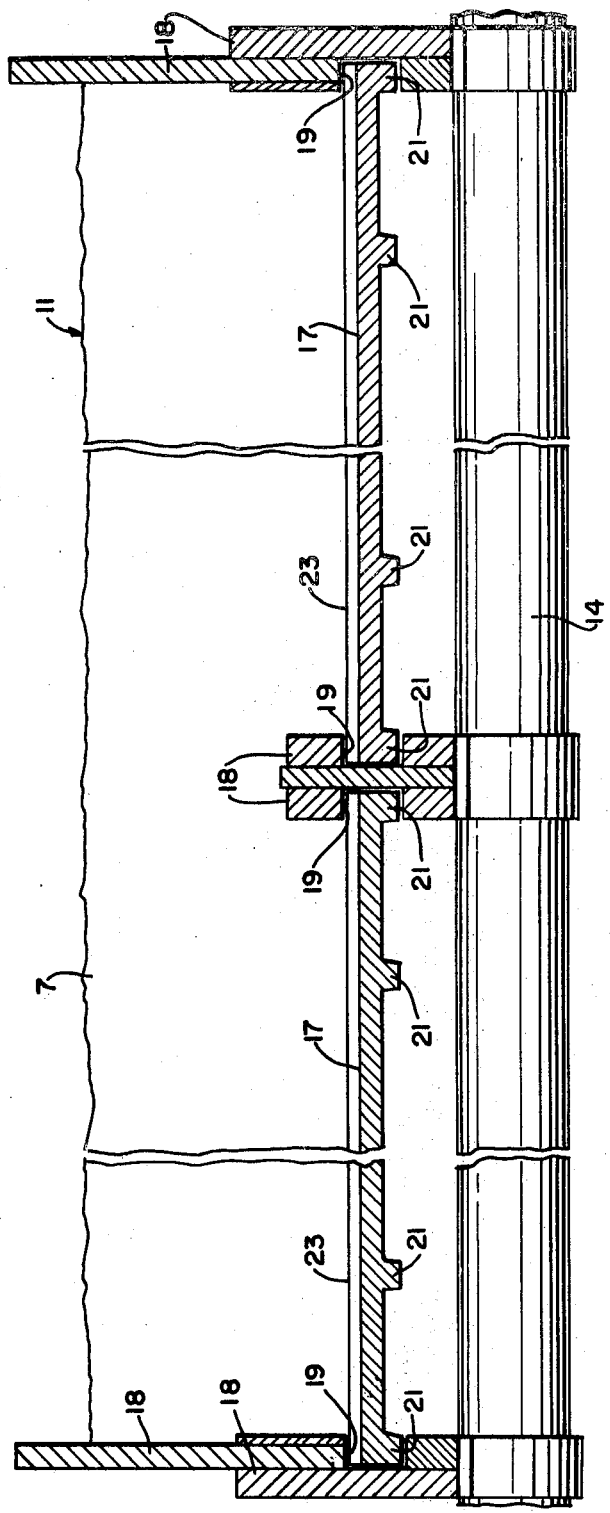
INVENTOR
RUSSELL B. SMITH
BY *Pennie, Edmonds,*
*Morton, Taylor and Adams*
ATTORNEYS

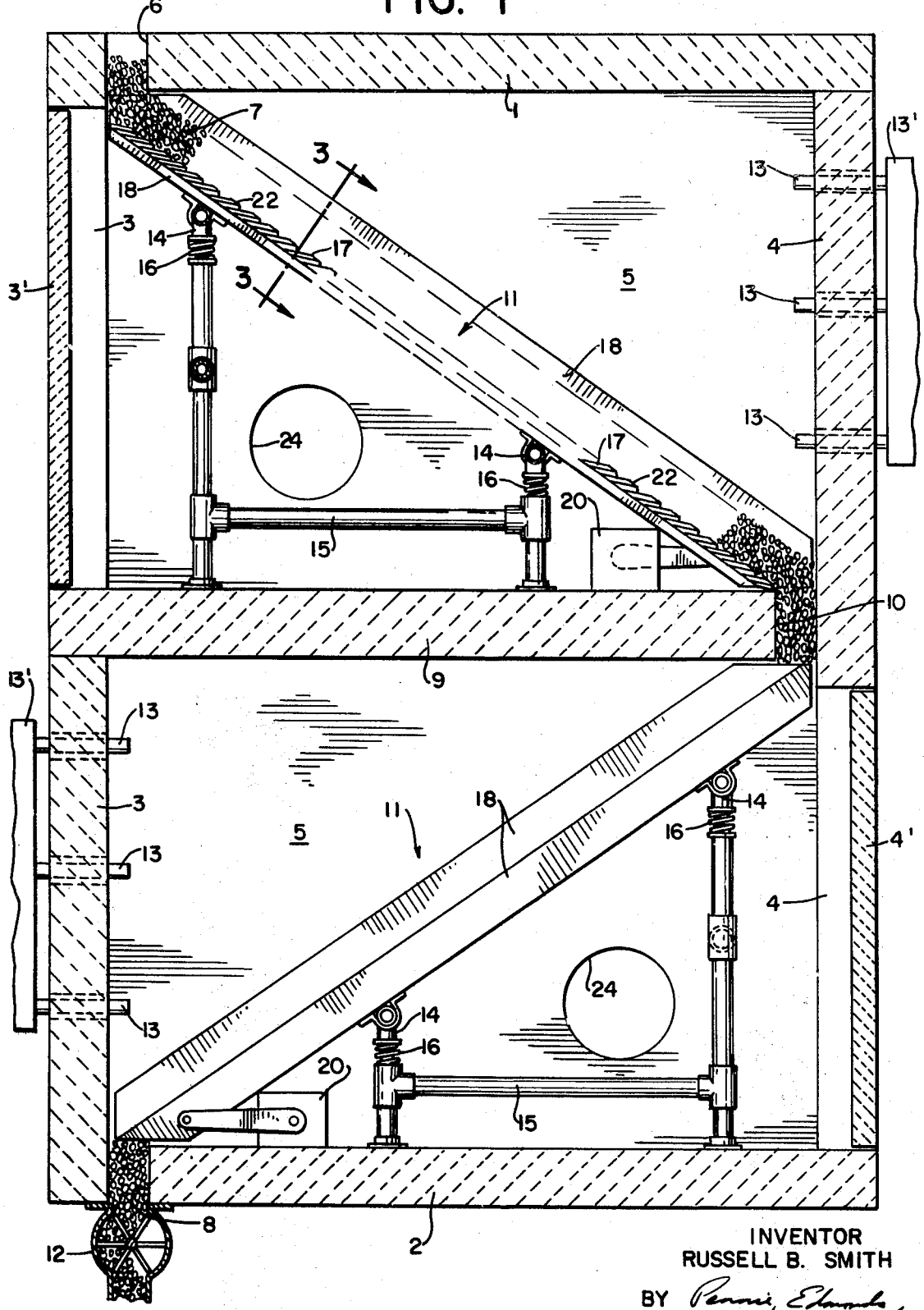

United States Patent Office 3,517,914
Patented June 30, 1970

3,517,914
VIBRATING FURNACE FOR PELLET MATERIAL
Russell B. Smith, Stamford, Conn., assignor to Pellite Corporation, Stamford, Conn., a corporation of Connecticut
Filed Feb. 6, 1968, Ser. No. 703,312
Int. Cl. F27b *3/04*
U.S. Cl. 263—21                                    20 Claims

ABSTRACT OF THE DISCLOSURE

A compact furnace for heating pellet material comprising a closed housing, a plurality of inclined support means extending in a zig-zag fashion from the top of the furnace to the bottom thereof for conveying a layer of pellet material through the furnace, and heating means for directing heat against the exposed surface of the layer of material as it passes through the furnace.

BACKGROUND OF THE INVENTION

Field of the invention

The present invention pertains to furnaces for heating pellet material such as pelletized clay or flyash to form a lightweight aggregate; and more particularly, to an enclosed compact furnace having supporting means for the pellet material which is constructed so as to successively expose both surfaces of a layer of pellet material directly to the blast of heat.

Description of the prior art

In present day power plants where furnaces using pulverized soft coal are employed, a considerable amount of flyash is produced as a by-product. This flyash is directed up the furnace stack and would normally be emitted to the atmosphere as a waste product causing pollution thereof. In order to avoid this undesirable pollution of the air, it is the present practice to filter the flyash out of the coal smoke passing up the furnace stack by means of a precipitator. For many years, the vast majority of this flyash which has been thus collected as a by-product of the coal burning furnace has simply been disposed of as a waste product. More recently, however, it has been discovered that this flyash when converted into pelletized aggregate is a usable product in the concrete building industry for making concrete products. Accordingly, electric utility companies which produce a large amount of flyash in their power plants are now converting this flyash into lightweight pelletized aggregate. The apparatus presently used in this conversion process includes essentially two parts, namely a pelletizer for initially converting the flyash into pellet form and a heating apparatus for converting the so-called green pellets produced by the pelletizing machine into lightweight aggregate.

The heating apparatus presently available for producing this lightweight aggregate is exceedingly expensive to manufacture and install and quite inefficient as far as heat loss. In addition, the typical heating apparatus requires considerable space for installation. In construction, the heating apparatus includes a long conveyor which is upwards to 100 ft. and upon which the pellet material is placed in a layer to form a bed of material. The conveyor is driven to move the bed along its length; and at the beginning of the conveyor run, burners are provided for initially directing heat against the upper surface of the bed. In addition, an exhaust means is disposed under the conveyor along its length for creating a downdraft through the bed to draw the heat therethrough. Typically, only the beginning of the conveyor run is heated under a firing hood while the remaining portion of its length is exposed. This produces a tremendous amount of lost heat which could otherwise be advantageously used in heating the layer of material. Also, since the layer of material is only heated at the beginning of its run along the conveyor and since all of this heat must be drawn through the layer of material from its upper exposed surface, a long length of conveyor is necessary to assure the best possible heating of the entire cross section of the material, and in particular its undersurface, by the time the material reaches the end of the conveyor run. Even with the heating apparatus as presently constructed, the undermost portion of the layer of material in many instances is not properly heated by the time it reaches the end of the conveyor and therefore must be passed again through the heating apparatus.

It is also important to note that with the presently constructed heating apparatus employing a long conveyor, the bed of material is moved on the conveyor as an integral mass with no relative movement between the individual pellets. This tends to cause the pellets to adhere to each other as they are heated with the result that some percentage of the end product is cohered together in the form of clinker cake which must be broken up by a clinker crushing operation. This, in turn, increases the cost of manufacture of the lightweight aggregate and creates costly and bothersome dust problems.

SUMMARY OF THE INVENTION

In accordance with the teachings of the present invention, applicant has devised a furnace for converting the pelletized flyash into saleable aggregate which compared to the presently available apparatus is less expensive to manufacture, install and maintain, more efficient in operation and more compact as far as space requirements are concerned.

Generally, the furnace constructed in accordance with the teachings of the present invention includes a closed, vertically oriented furnace housing, an inlet at the upper end of the housing for feeding the pellet material to be heated into the furnace, an outlet at the bottom of the housing for drawing the heated material out of the furnace, and a plurality of tiered, downwardly inclined supports for carrying a layer of pellet material through the furnace.

In each tier of the furnace, burners are provided for directing a blast of heat against the exposed upper surface of the layer of pellets and exhaust means are positioned behind the support for creating a draft through the material and the supports, the supports being of open construction for permitting the creation of this draft. Between each tier of the furnace, a horizontally extending partition defining a refractory floor or deck and having a passageway therethrough is provided for permitting passage of the pellets from tier to tier. The downwardly inclined support in each successive tier extends in a direction opposite to the vertically adjacent support whereby the layer of material as it passes downwardly from one tier to the next is inverted to expose the previously underlying surface to the heat of the furnace. Also, in contrast to the moving conveyor means of the conventional heating apparatus where the layer of material is caused to move along the run of the conveyor as an integral mass, the supports of each tier of the furnace of the present invention are constructed such as to cause the layer of pellets to move relative thereto and to also cause the individual pellets to roll with respect to each other.

With the furnace constructed as described above, the heat supplied to the material is efficiently contained within the furnace for maximum heating of the entire exposed surface of the material; and due to the reversing of the exposed surface of the layer of material as it passes from one tier to the next, this heat is applied to both sides of the layer thus assuring complete heating through its entire thickness. In addition, the exhaust disposed behind the open supports of each tier assist in completely heating the interior portions of the layer of material and constrain and automatically remove any dust drawn out of the material. By having the layer of material move with respect to the underlying support of each tier of the furnace, the individual pellets roll relative to each other thus exposing each facet of each pellet to heat and discouraging any fusing together of adjacent pellets. Instead of having an apparatus requiring at least 100 ft. of open area for a horizontally extending conveyor, the furnace of the present invention can be constructed as a portable device taking up a floor space of as little as 5' x 10' and a height of as little as 7'.

BRIEF DESCRIPTION OF THE DRAWINGS

FIG. 1 is a cross-sectional view of the furnace of the present invention;

FIG. 2 is an enlarged cross-sectional view of the grate means shown in FIG. 1; and FIG. 3 is a cross-sectional view, on an enlarged scale, taken along line 3—3 of FIG. 1.

DESCRIPTION OF THE PREFERRED EMBODIMENT

As shown in FIG. 1, the furnace of the present invention comprises a vertically oriented furnace housing having upper and lower floors 1 and 2 and opposed end walls 3 and 4. The housing also includes side walls extending between the walls 3 and 4, one of which is shown at 5, to provide a completley close furnace. The upper floor of the housing is provided with a material inlet passageway 6 through which the material 7, as for example pelletized flyash or clay, is adapted to be fed into the furnace. The lower floor of the furnace is, in turn, provided with a material outlet passageway 8 through which the material 7 exists after passing through the furnace and being subjected to a sintering operation.

A floor 9 forming a partition and dividing the furnace into upper and lower tiers, is positioned centrally between the upper and lower floors. This partition extends across the interior of the housing from the end wall 3 to a point adjacent to but spaced from the end wall 4. The spacing between the floor and the end wall 4 provides an intermediate material passageway 10. As shown in FIG. 1, this intermediate passageway is disposed across the housing relative to both the inlet passageway 6 and the outlet passageway 8 of the furnace.

In each of the tiers of the furnace, supporting means in the form of vibrating grates generally designated at 11 are provided for conveying the material 7 between the vertically adjacent passageways of the furnace. By means of these grate assemblies, the layer of material entering the furnace through the passageway 6 is first conveyed downwardly in one direction through the furnace until it passes through the intermediate passageway 10. At this point, the layer is automatically inverted as it moves onto the grate disposed in the lower tier. In this inverted condition, the material then moves downwardly to the outlet passageway 8. For controlling the rate of flow of the material through the furnace, a rotating vane valve 12 or other conventional means is provided at the outlet passageway 8.

In order to subject the material being fed through the furnace to the heat necessary for sintering, a plurality of burner nozzles 13, connected to a suitable source of heat 13', are provided in the walls 3 and 4. These burner nozzles direct a blast of heat against the exposed surface of the layer of material in each tier of the furnace. For sintering pelletized flyash, for example, this heat will be supplied at about 2300° F.

As shown in the drawings, the grate means 11 in each tier of the furnace is provided with downwardly extending support legs 14 which are, in turn, mounted on the framework support structure 15 by way of coil springs 16. Each grate means or assembly is, in turn, comprised of a plurality of vertically spaced grate bar units 17 oriented but not attached together in slots 19 in framework 18. In the particular embodiment of the furnace shown in the drawings, the vertically spaced grate bar units include two grate bar members positioned end-to-end and extending across the width of the furnace although there may be a multiplicity of these widths for greater production volume. The framework 18 constrains the units against undue vertical movement; and the grate bars are of a length slightly less than the distance between the walls of the associated slots 19 so as to provide for expansion of the bars during operation of the furnace. Power driven vibrating means 20 or other conventional means are provided for vibrating each of the grate bar assemblies along a horizontal plane. Although two power driven vibrating means are shown in FIG. 1 of the drawings, one such unit may be provided for vibrating both grate bar assemblies, if desired. The grate bar assemblies used in the furnace may be quite heavy; however, due to their floating support on the spring 16 and in the framework 18, virbation in the horizontal direction is readily produced. With this construction, the grate bar assemblies are vibrated in the horizontal direction along a stroke of about 1/1000 of an inch and at a frequency of about 3600 vibrations per minute. Removable doors 3' and 4' are included in the end walls of each tier of the furnace for permitting access to and removal of the entire grate assemblies.

In accordance with the teachings of the present invention, the construction of each of the grate bars 17 is such as to most efficiently control the movement of the layer of material thereover and to create the most efficient heating of the individual pellets. As shown in FIG. 2, each of the grate bars of the assemblies are spaced vertically from each other and each is provided with downwardly extending rib members 21 supported by the upper surface of the next underlying grate bar. As shown in FIG. 3, these rib members are spaced laterally from each other. In the preferred embodiment of the invention shown in the drawings, the length of each individual grate bar is on the order of 18–19 inches while the cross-sectional thickness of the grate bar, excluding the ribs, is about ¼". Also, the ribs themselves extend downwardly from each grate bar at a distance of about ¼" to provide a ¼" opening between the grate bars for purposes of creating an efficient draft through the material on the grate bars as more fully described below.

Each of the grate bars includes a first supporting surface 22 which is inclined downwardly in a path of movement of the material being conveyed between the vertically adjacent passageways of the furnace. With respect to the horizontal, these supporting surfaces 22 are disposed at an acute angle of about 35°; and each of the surfaces 22 of each of the grate bars of a single assembly are disposed in a common plane. Extending from the upper edge of the surface 22 of each grate bar is a second material supporting surface 23 which is disposed at an acute angle of about 15° relative to the horizontal. The lower edge of the first supporting surface 22 of each grate bar overlies the second supporting surface 23 of the next underlying grate bar; and the vertical spacing between the surface 23 of each grate bar and the parallel undersurface of the adjacent grate bar defines the draft opening through the grate means. As seen from FIG. 2, these openings extend in an upwardly inclined direction. With this construction, the flow of the layer of pellet material downwardly over the grate bar means is very substantially regulated. The vibration of the grate bar means assists in controlling this flow and assures that individual pellets do not collect on the supporting surfaces 23 while the upward inclination of the openings between the vertically adjacent bars prevents the individual pellets from falling off behind the grates.

For creating a high draft of heat through the layer of material as it passes down the grate bar means, exhaust ducts 24 are provided behind each grate bar means and suitable exhaust means are connected to these ducts to draw the heat issuing from the burner nozzles through the layer of material and through the openings between the grate bars. The exhaust means is of conventional construction and includes an exhaust fan and filtering system for removing dust which has been drawn out of the layer of material.

In operation, the material to be sintered, such as pelletized flyash having pellet sizes ranging from dust particles to ¾" in diameter, is fed through the inlet passageway 6 and flows in a layer down each of the grate means. The construction of the grates and use of the discharge control valve 12 assures that the layer of material is maintained at a uniform depth. Also, the blast of heat being supplied through the nozzles 13 is directed against the flow of material to prevent the pellets, especially the larger ones, from rolling down too rapidly and piling up at the bottom of the grate run.

The blast of heat directed against the exposed surface of the layer of material in the upper tier of the furnace is maintained at a temperature of about 2300° F. to cause a predetermined heating of the layer to a depth of at least half its thickness by the time the layer reaches the intermediate passageway 10 in the partition 9. This predetermined heating is sufficient to effect the desired sintering of the pellet material in the upper half of the layer. Then, as the layer of material is inverted and continues through the lower tier of the furnace, the remaining half of its thickness will be heated to the desired temperature by the time it reaches the outlet passageway 8. At this point, the entire layer of material will have been heated throughout its thickness to the desired sintering temperature.

The layer of material being fed to the furnace is in loose pellet form and with the sloping and vibrating grate bar assemblies, this layer is not only caused to flow down the grate bar assembly, but the individual pellets thereof are caused to rotate with respect to each other so as to expose each facet of each pellet to the blast of heat entering the furnace through the nozzles 13. Also, the size of the intermediate passageway 10 is complementary in shape to the cross-sectional dimensions of the layer of material 7 so as to keep the individual pellets of material in substantially fixed rolling orientation relative to each other as the layer is inverted. This assures that the material exposed to the heat in the lower tier will be the portion of the layer which has not been subjected to direct heat in the upper tier. Furthermore, the movement of the layer of material relative to the conveying structure and the rolling action of the individual pellets prevents fusing of the pellets thus avoiding the necessity of crushing the product issuing from the furnace, and instead, a saleable, lightweight aggregate is produced.

The above description of the present invention has been made with reference to the presently preferred embodiment; however, it is to be understood that various changes may be made thereto without departing from the scope of the invention as set forth in the following claims.

What is claimed is:

1. A compact furnace for heating pellet material comprising:
   (a) a closed vertically oriented furnace housing having upper and lower floors, end walls and side walls;
   (b) at least one partition extending across the interior of said housing intermediate its upper and lower floors from one end wall thereof to a point adjacent to but spaced from the opposed end wall thereof to define an intermediate material passageway between said partition and said opposed end wall;
   (c) a material inlet passageway at the upper end of said housing disposed across said housing from the intermediate material passageway of the adjacent underlying partition;
   (d) a material outlet passageway at the lower end of said housing disposed across said housing from the intermediate material passageway of the adjacent overlying partition;
   (e) vibrating grate means extending between each vertically adjacent passageway for carrying a layer of material of predetermined cross-sectional shape from said inlet passageway to said outlet passageway via said intermediate passageways and including a plurality of vertically spaced grate bars extending laterally of the path of movement of said material between said vertically adjacent passageways, said intermediate passageways having a shape complimentary in shape to the cross-sectional shape of the layer of material disposed on said grate means;
   (f) heating means for directing a forced blast of heat against the entire upper surface of the layer of material disposed on each grate means, through said layer of material and through the underlying grate means; and
   (g) exhaust means disposed behind each grate means for directing said blast of heat away from said grate means to create a high draft of heat through said layer of material and said grate means.

2. A compact furnace according to claim 1 wherein:
   (a) the upper material supporting surfaces of the individual grate bars of each grate means are inclined downwardly in a direction extending along the path of movement of said material thereon between the associated vertically adjacent passageways.

3. A compact furnace according to claim 2 wherein:
   (a) the individual grate bars of each grate means are spaced vertically of each other to define openings through said grate means that extend from the material supporting surfaces thereof in an upwardly inclined direction.

4. A compact furnace according to claim 3 wherein:
   (a) each of said passageways have a size complimentary in shape to the cross-sectional shape of the layer of material disposed on said grate means.

5. A compact furnace according to claim 4 wherein:
   (a) said heating means is constructed to supply heat at a temperature whereby said material is heated to a predetermined minimum temperature throughout its thickness by the time it reaches said outlet passageway.

6. A compact furnace according to claim 5 wherein:
   (a) a single partition is disposed centrally between the upper and lower floors of said funace; and
   (b) said heaating means is constructed to supply heat against the supper surface of the layer of material disposed on each grate means at a temperature sufficient to heat said layer of material to a depth of about one-half its thickness to said predetermined minimum temperature by the time said material reaches the immediately underlying passageway.

7. A compact furnace according to claim 6 further including:
   (a) means for producing the vibration of said grate means along a horizontal direction including:
      (1) spring supports for said grate means; and
      (2) horizontally vibrating power means connected to said grate means.

8. A compact sintering furnace for sintering pellet material comprising:
   (a) a closed vertically oriented furnace housing having upper and lower floors, end walls and side walls;
   (b) at least one partition extending across the interior of said housing intermediate its upper and lower floors from one end wall thereof to a point adjacent to but spaced from the opposed end wall thereof to define an intermediate material passageway between said partition and said opposed end wall;

(c) a material inlet passageway at the upper end of said housing disposed across said housing from the intermediate material passageway of the adjacent underlying partition;

(d) a material outlet passageway at the lower end of said housing disposed across said housing from the intermediate material passageway of the adjacent overlying partition;

(e) vibrating grate means extending between each vertically adjacent passageway for carrying a layer of said material from said inlet passageway to said outlet passageway via said intermediate passageways, and including a plurality of vertically spaced grate bars extending laterally of the path of movement of said material between said vertically adjacent passageways, each of said grate bars having:

(1) a first material supporting surface inclined downwardly in a direction extending along the path of movement of said material thereon between the associated vertically adjacent passageways at a first acute angle relative to the horizontal and terminating in lower and upper edges extending laterally of said path of movement of the material, and (2) a second material supporting surface extending from the upper edge of said first supporting surface at a second acute angle relative to the horizontal less than said first acute angle to define openings through said grate means that extend along the second material supporting surface thereof in an upwardly inclined direction.

9. A compact sintering furnace according to claim 8 wherein:

(a) the lower edge of said first supporting surface of each grate bar of each of said grate means overlies the second supporting surface of the next underlying grate bar at a distance spaced from the upper edge of said first supporting surface.

10. A compact sintering furnace according to claim 9 wherein:

(a) the first supporting surfaces of the grate bars of a single grate means are disposed in a common plane.

11. A compact sintering furnace according to claim 10 wherein:

(a) the spacing between adjacent grate bars is about equal to the average particle size of the individual pellets of said material.

12. A compact sintering furnace according to claim 11 wherein:

(a) each of said passageways have a size complimentary in shape to the cross-sectional shape of the layer of material disposed on said grate means.

13. A compact sintering furnace according to claim 12 wherein:

(a) said heating means is constructed to supply heat at a temperature whereby said material is heated to a predetermined minimum temperature throughout its thickness by the time it reaches said outlet passageway.

14. A compact sintering furnace according to claim 13 wherein:

(a) a single partition is disposed centrally between the upper and lower ends of said furnace; and (b) said heating means is constructed to supply heat against the upper surface of the layer of material disposed on each grate means at a temperature sufficient to heat said layer of material to a depth of about one-half its thickness to said predetermined minimum temperature by the time said material reaches the immediately underlying passageway.

15. A compact sintering furnace according to claim 14 further including:

(a) means for producing the vibration of said grate means along a horizontal direction including:
(1) spring supports for said grate means, and
(2) horizontally vibrating power means connected to said grate means.

16. A compact sintering furnace according to claim 15 wherein:

(a) the individual grate bars of each grate means are assembled together but not fastened to each other for vibrating movement in unison with each other and with allowance for expansion due to temperature.

17. A compact sintering furnace according to claim 16 wherein:

(a) the undersurface of each grate bar is disposed substantially parallel to the second supporting surface of the next underlying grate bar.

18. A compact sintering furnace according to claim 17 further including:

(a) supporting ribs positioned between each of said grate bars at spaced locations laterally thereof for supporting each grate bar on the next underlying grate bar.

19. A compact sintering furnace according to claim 18 wherein:

(a) said supporting ribs include laterally spaced ribs members extending downwardly from the undersurface of said grate bars.

20. A compact sintering furnace according to claim 19 wherein:

(a) said first acute angle is about 35°; and
(b) said second acute angle is about 15°.

References Cited

UNITED STATES PATENTS

| | | |
|---|---|---|
| 1,611,098 | 12/1926 | Borner. |
| 2,331,419 | 10/1943 | Patterson. |
| 2,521,591 | 9/1950 | Martin. |

FOREIGN PATENTS

| | | |
|---|---|---|
| 182,668 | 7/1955 | Austria. |

JOHN J. CAMBY, Primary Examiner

U.S. Cl. X.R.

263—27